United States Patent [19]

Coughlin et al.

[11] 4,330,109
[45] May 18, 1982

[54] HEAVY DUTY CARRIAGE ASSEMBLY

[75] Inventors: William J. Coughlin, Lancaster; David E. Johnson, Pataskala; Kenneth E. McCall, Lancaster, all of Ohio

[73] Assignee: Arcair Company, Lancaster, Ohio

[21] Appl. No.: 234,229

[22] Filed: Feb. 13, 1981

[51] Int. Cl.³ .............................................. B23K 7/10
[52] U.S. Cl. ....................................................... 266/67
[58] Field of Search ..................................... 266/67, 48

[56] References Cited

U.S. PATENT DOCUMENTS

| | | | |
|---|---|---|---|
| Re. 28,121 | 8/1974 | Gulley | 266/56 |
| 1,320,687 | 11/1919 | Harris | 266/67 |
| 2,253,540 | 8/1941 | Stoneberg | 266/67 |
| 2,283,347 | 5/1942 | Young | 266/67 |
| 2,466,143 | 4/1949 | Young | 266/67 |

*Primary Examiner*—W. Stallard
*Attorney, Agent, or Firm*—James C. Simmons; E. Eugene Innis

[57] ABSTRACT

A heavy duty carriage assembly for supporting and guiding a metal-working tool along a fixed path the assembly having a three wheeled support with two driven wheels and a single leading wheel. The carriage assembly is guided along a path determined by a rail, removably mounted on the surface of the workpiece to be acted upon by the metal-working tool, by guides mounted on the carriage sliding along the rail.

9 Claims, 7 Drawing Figures

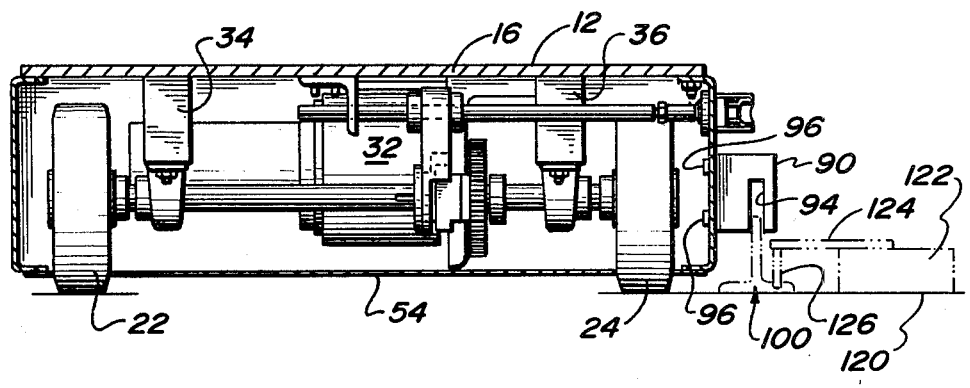
FIG. 3
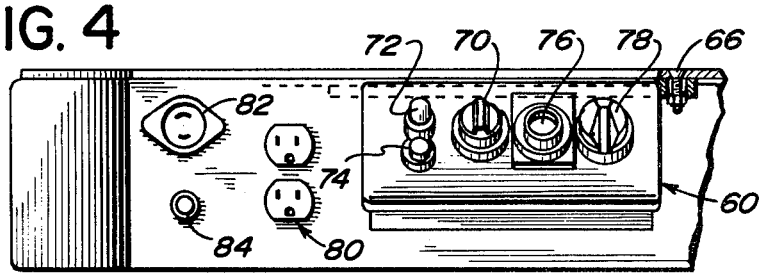
FIG. 4
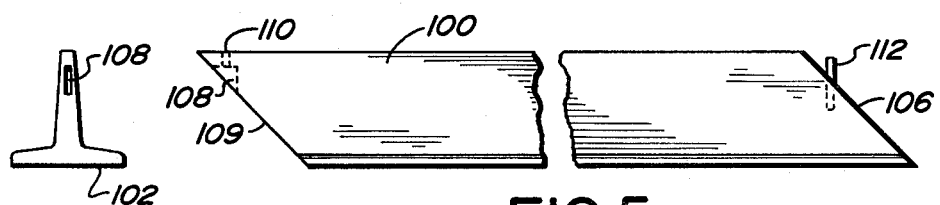
FIG. 5
FIG. 6
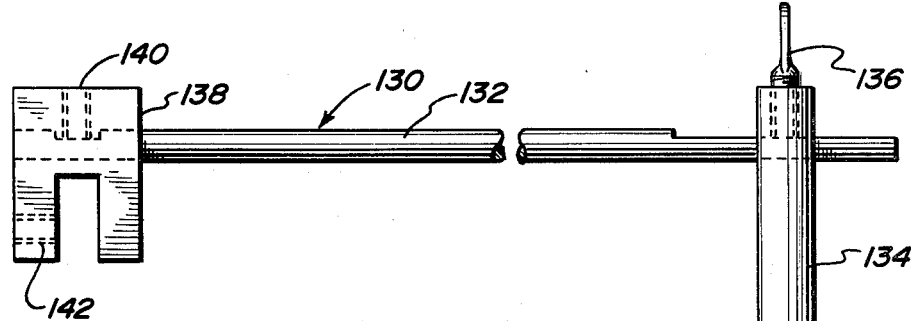
FIG. 7

HEAVY DUTY CARRIAGE ASSEMBLY

TECHNICAL FIELD

The present invention pertains to heavy-duty machine carriages for supporting and guiding a metal-working tool along a fixed path on a workpiece. Such carriages are used for carrying conventional air-carbon arc cutting and gouging equipment and/or welding equipment over the surface of a structure or structural shape such as a steel plate to produce a gouge and/or a finished weldment.

BACKGROUND OF THE PRIOR ART

Heavy-duty carriage assemblies are used in heavy-duty plate fabrication where a tool has to be guided along the edge of a plate for surface preparation, along a portion of the surface of the plate to remove defects, or to support a torch to butt weld plates together as in fabrication of marine vessels and the like. The Arcair Company of Lancaster, Ohio offers such a device for sale under the designation one-half ton machine carriage as illustrated in their brochure entitled "Arcair Travel Systems." The heavy-duty carriage described in the foregoing brochure is a four wheel drive device that requires parallel tracks which support the driven wheels and which guide the carriage along its path. Such a carriage does an excellent job, however, because the rails must be maintained in parallel alignment to the edge of the plate or defect, alignment of such a device before the fabrication operation begins is a problem. Heavy-duty carriages are a complement to the lighter carriages such as described in the foregoing brochure and sold under the trademark CLIMBER.

U.S. Pat. No. Re. 28,121 describes one type of light-duty carriage which features a plurality of swiveled wheels which mount against the edges of a track which is magnetically coupled to the workpiece for guiding the carriage. Motive power is provided by a rack on the track which mates with a gear drive on the carriage. Such carriages are very successful for use in the flame cutting of metallic workpieces.

Three wheeled light-duty carriages wherein the supporting and driven wheels are aligned on parallel tracks are disclosed in U.S. Pat. Nos. 1,320,687 and 1,867,047. These devices rely upon parallel tracks which, in turn, must be aligned parallel to the direction of travel of the metal-working tool (e.g. flame cutting torch) in order to achieve the intended purpose.

U.S. Pat. Nos. 2,283,347 and 2,466,143 disclose light-duty carriages wherein a single rail in the form of an angle iron is utilized as the guide rail for the carriage. In both of these devices, the carriage support mechanism relies upon the wheels riding on the rail to support the carriage and the torch. In both cases a friction drive is used to propel the carriage along the workpiece.

BRIEF SUMMARY OF THE INVENTION

The present invention is a heavy-duty carriage assembly for supporting and guiding a metal-working tool along a fixed path wherein a tool supporting platform having the general shape of a polygon having at least two sides generally perpendicular to each other. One preferred shape is that of a rectangle wherein a triangular corner is removed from the rectangle, thus defining a shape platform having two original sides of the rectangle and a truncated long and short side. The platform is supported by a three wheeled assembly wherein two of the wheels may be driven and are generally disposed adjacent to the shorter full side of the rectangle and a third or leading wheel is disposed adjacent the truncated short side of the platform with guide means adapted for slideably engaging a rail mounted parallel to the long side of the supporting platform for guiding the carriage along its intended path. The guide rail is a simple extrusion having a T-shape cross-section which is inverted onto the surface over which the carriage assembly will run and can be affixed to the surface by magnets, fasteners or clamps is as well known in the art. The rail can be made in sections for ease of storage and use. A simple tool comprising an elongated rod with a pointer on one end and a guide such as utilized on the machine carriage can be employed for rapid set-up of the carriage.

The wheels can be of a composition material that will provide good frictional engagement wih a workpiece such as a steel plate and can be directly driven by a variable speed reversing motor to provide precise movement of the carriage along the path. Since the wheels do not ride on a track, any lateral motion of the wheels will not affect the tracking of the metal-working tool on the carriage.

BRIEF DESCRIPTION OF THE DRAWING

FIG. 3 is a section taken along the line 3—3 of FIG. 1.

FIG. 4 is a fragmentary front view of the control apparatus for the carriage of FIG. 1.

FIG. 5 is a front elevational view of a section of the rail used with the carriage of FIG. 1.

FIG. 6 is a left side elevational view of the rail of FIG. 5.

FIG. 7 is a front elevational view of the set-up apparatus used to position the rail of FIG. 5.

DETAILED DESCRIPTION OF THE INVENTION

Figure 1:
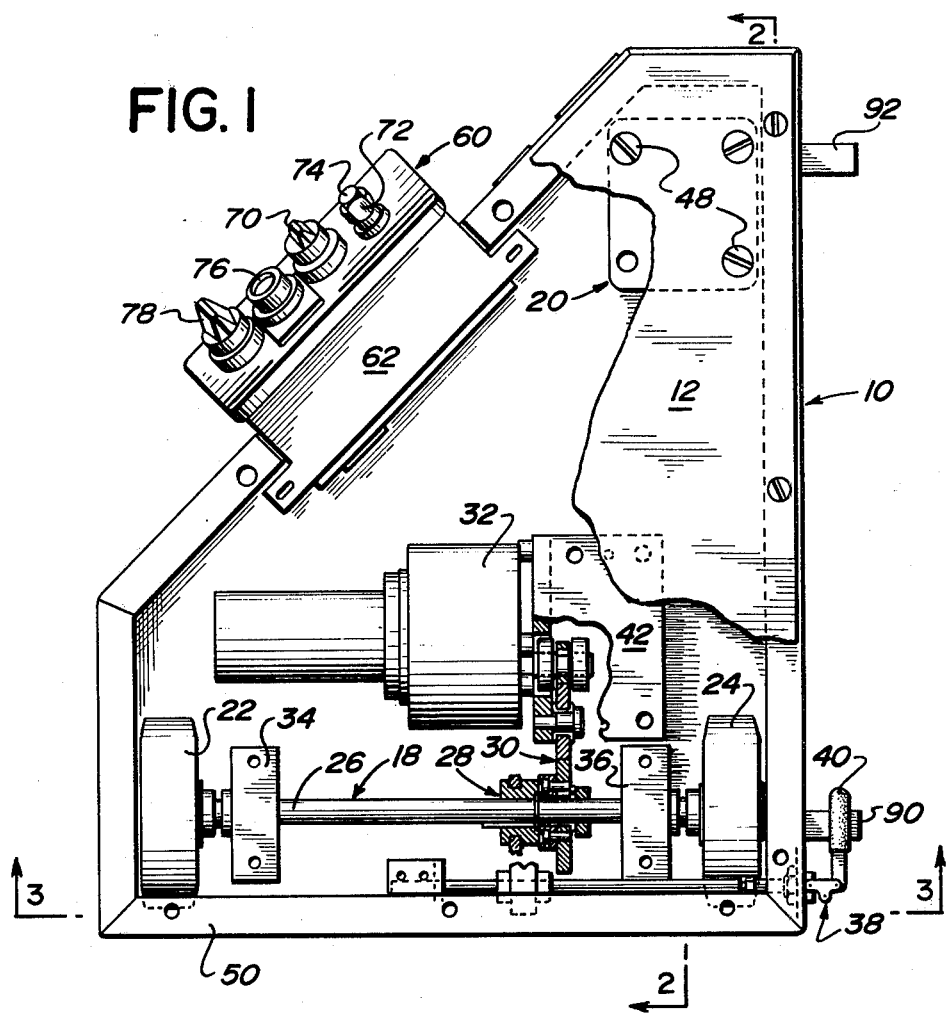
FIG. 1 is a top plan view of the heavy-duty carriage according to the present invention with the top plate removed and with the drive mechanism shown in partial section.
Figure 2:
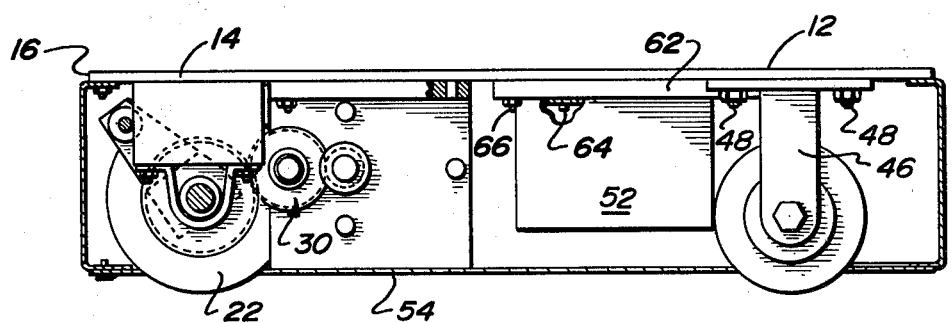
FIG. 2 is a section taken along the line 2—2 of FIG. 1.

Referring to the Drawing and in particular, to FIGS. 1, 2 and 3, the carriage assembly 10 includes a tool supporting platform 12 (FIG. 2, FIG. 3) which is in the shape of a polygon having at least two perpendicular sides, 14, 16. In the apparatus according to the present invention, the shape of platform 12 can be equated to a rectangle having two full sides (14 and 16) and 2 truncated sides which are created by removing a triangle from one corner of the rectangle to achieve the shape shown in the Drawing. However, it should be noted that the shape of the platform 12 need not be as shown as long as there are two perpendicular sides such as 14 and 16.

Depending from platform (mounting plate or tool supporting surface) 12 is a first or driven wheel assembly 18 and a second or leading wheel assembly 20. Driven wheel assembly 18 includes a pair of drive wheels 22, 24 journaled by suitable bearing means to a drive shaft 26, which in turn is connected through a clutch assembly 28 and idler gear assembly 30 to a drive motor 32. The drive motor 32 is preferably a direct current variable speed reversing motor suitable for rapid start, stop and reverse operation. Driven shaft 26 is fixed to mounting plate 12 by a pair of mounting pads 34, 36 as is well known in the art. Driven wheel assembly 18 includes a suitable declutching mechanism 38 operated by handle 40 disposed outwardly of the carriage assembly for easy access. The entire drive assembly including motor 32 is affixed to the bottom of plate 12 by a suitable mounting assembly 42. A leading wheel assembly 20 includes a rigid caster 46 fixed to the underside of plate 12 by a plurality of counter-sunk bolts 48.

In the apparatus of FIG. 1, the entire mounting plate 20 is closed by a depending skirt 50 which extends around the periphery of the plate and is continuous save for a control box aperture 52 (FIG. 2). The skirt 50 prevents unwanted debris from entering into the mechanism of the carriage and isolates the inner workings of the carriage from the user. Furthermore, with a bottom cover 54 (FIG. 2, FIG. 3) the carriage assembly provides an interior for storing an elongated electrical control cord as will hereinafter be more fully explained.

Referring to FIGS. 4 and 5, the apparatus of FIG. 1 includes a control box assembly 60 which is removably mounted to a control box receiving bracket 62 mounted on the bottom side of plate 12 as shown in FIG. 2. The control box assembly is fixed to the mounting plate 62 by means of removable recessed machine screws, one of which is shown as 64 in FIG. 2. The control box mounting bracket 62 is in turn fixed to the plate 12 by a pair of bolts, one of which is shown as 66 in FIGS. 3 and 4. Control box assembly 60 includes an on-off switch 70 indicator light 72 and fuse 74, speed control rheostat 76 and directional control switch 78. The control box assembly is electrically connected to the motor assembly 32 as is well known in the art and by use of a long cord, the control box assembly 60 can be removed from the carriage for remote operation of the carriage by an operator. Alternatively, if the control box is left mounted on the carriage assembly, then the operator can have ready access to the electrical controls.

Mounted on depending skirt 50 adjacent to the control box assembly is a dual receptacle 80 so that accessories may be mounted on the carriage to provide oscillating motion or other functions associated with the tool mounted on the carriage. Male electrical connector 82 and fuse assembly 84 are included as the main power connection and circuit protector for the machine carriage as is well known in the art.

Mounted on the carriage, or in the case of the apparatus shown, on the depending skirt, are a pair of guideblocks 90, 92 which contain rectangular slots 94 (FIG. 3) which are adapted to slidably engage the rail 100. Guideblocks 90, 92 are rigidly fixed to the skirt by a plurality of machine screws 96 as shown in FIG. 3. The blocks 90, 92 are aligned so that the slot in each block is parallel and will provide precise tracking of the carriage parallel to the rail 100.

FIGS. 5 and 6 show the rail 100 which has a T-shaped cross section, the top 102 of the T being adapted for mounting on a work piece by fasteners, clamps or being fastened to magnets which in turn will contact the work piece. Such mounting devices are well known in the art. The rail 100 is manufactured in suitable lengths (e.g. aluminum extrusion) and has a chamfered ends 104, 106, one end of which contains a recess 108 and dowel hole 110, the other end containing a suitable dowel 112 so that as successive lengths of the rail are assembled, the dowel 113 fits in the dowel hole 110 to precisely align each succeeding section of rail. As shown in dotted lines in FIG. 3, rail 100 can be fixed to the work surface 120 by means of a magnet 122, having a mounting arm 124 and pin 126 which fits in a suitable recess in the top of T-section rail 100.

As shown in FIG. 7, a setup tool 130 includes a bar 132 having a slidable pointer 134 which can be slidably moved along bar 132 and have a fixed position on bar 132 by means of a thumb screw 136. The opposite end of rod 132 is fixed to a guideblock 138 identical to guideblock 90 or 92 mounted on the carriage assembly 10. Guideblock 138 can be fixed to rod 132 by a suitable set screw 140 and can be fixed to rail 100 by means of another set screw 142. When the rail is set up on a work piece, the guide 130 is fixed to the rail by means of mounting block 138 and the pointer positioned to the precise distance between the mounting blocks 90, 92 of carriage assembly 10 and the point at which the tool to be carried by the carriage assembly 10 is to act on the work piece. Utilizing guide 130 rails 100 can be quickly and precisely aligned on the work piece to determine the path of travel of the carriage assembly 10. The carriage assembly 10 is then fixed to the rail, the tool, such as the welding torch, is then positioned to traverse that portion of the work piece on which it is to act, the torch energized and the carriage energized for accomplishing the intended work on the work piece.

A carriage assembly according to the present invention can be utilized to carry mechanical as well as thermochemical tools to provide machining, cutting or welding, air carbon-arc cutting and gouging or like operations on a work piece such as a large metal plate which may be used for a pressure vessel, ship, barge, or other static or dynamic structural member.

While the overall shape of the carriage is specifically shown in the drawing, the 3-wheeled assembly lends itself to a number of shapes as long as two sides of the polygon are perpendicular, thus facilitating alignment of the driven and leading wheel.

It is also within the scope of the invention to drive the leading wheel rather than the back wheels; however, better traction can be obtained by propelling two wheels as opposed to one.

Alternate arrangements of the drive mechanism are thus within the scope of the present invention.

It is also within the scope of the invention to include small brushes or other cleaning devices mounted in front of the wheels to remove particles of dirt or debris that would interfere with continuous contact of the wheel with the surface on which the carriage is running.

Having thus described our invention, what we desire to be secured by letters of patent of the United States is set forth in the appended claims.

STATEMENT OF INDUSTRIAL APPLICATION

A machine carriage according to the invention is a portable, rugged, heavy duty unit designed for low maintenance and high performance in straight line operation. Since it has three wheels instead of four, it has a steady sure-footed stance which assures greater stability even on warped plates.

Light carriage weight and lighter, easier to handle track permits fast, simple setup. The rugged mounting platform will carry up to 300 pounds of equipment for automated air carbon-arc gouging, gas metal arc welding, tungsten inert gas welding, and submerged arc welding, or flame cutting edge preparation.

We claim:

1. A heavy-duty carriage assembly for supporting and guiding a metal-working tool along a fixed path comprising in combination:
   a tool supporting platform having the shape of a polygon with at least two perpendicular sides;
   a pair of wheels depending from said platform and positioned adjacent to one of said perpendicular sides;
   a leading wheel depending from said platform adjacent to the other of said perpendicular sides;
   means to drive at least one of said wheels, said drive means depending from said platform;
   guide means mounted parallel to one of said perpendicular sides, said guide means adapted to slidably engage a thin elongate rail mounted on a surface along which said carriage is to guide said metal-working tool.

2. A carriage assembly according to claim 1 wherein a depending rigid skirt is disposed around the periphery of said platform, said skirt adjusted to support said guide means.

3. A carriage assembly according to claim 1 including a removable control box assembly depending from said platform.

4. A carriage assembly according to claim 2 wherein said removable control box fits within a portion of said skirt.

5. A carriage assembly according to claim 1 wherein said drive means includes a reversible variable speed direct current motor.

6. A carriage assembly according to claim 1 wherein said rail is an elongated T-shaped structure adapted to be fixed to the surface along which said carriage assembly will move by fixing the top of said T to said surface.

7. A carriage assembly according to claim 6 wherein said rail is fixed to said surface by suction cups, fasteners, magnetic means or the like.

8. A carriage assembly according to claim 1 wherein said pair of wheels are fixed on opposite ends of common axle.

9. A carriage assembly according to claim 1 or claim 8 wherein said pair of wheels are driven.

* * * * *